US006763319B2

United States Patent
Handa et al.

(10) Patent No.: US 6,763,319 B2
(45) Date of Patent: Jul. 13, 2004

(54) PROFILOMETER AND METHOD FOR MEASURING, AND METHOD FOR MANUFACTURING OBJECT OF SURFACE PROFILING

(75) Inventors: Koji Handa, Osaka (JP); Keiichi Yoshizumi, Higashiosaka (JP); Keishi Kubo, Moriguchi (JP); Hiroyuki Takeuchi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 45 days.

(21) Appl. No.: 10/159,565

(22) Filed: May 31, 2002

(65) Prior Publication Data

US 2002/0183964 A1 Dec. 5, 2002

(30) Foreign Application Priority Data

Jun. 4, 2001 (JP) ..................................... P2001-168154

(51) Int. Cl.[7] ............................................. G01B 11/24
(52) U.S. Cl. ....................................... 702/168; 356/609
(58) Field of Search ........................... 702/168; 700/56, 700/193; 356/609; 73/105

(56) References Cited

U.S. PATENT DOCUMENTS

| | | | | |
|---|---|---|---|---|
| 5,455,677 A | * | 10/1995 | Yoshizumi et al. | ......... 356/609 |
| 6,112,423 A | | 9/2000 | Sheehan | |
| 6,272,907 B1 | * | 8/2001 | Neukermans et al. | ......... 73/105 |

FOREIGN PATENT DOCUMENTS

| | | | | |
|---|---|---|---|---|
| GB | 2 350 429 A | 11/2000 | | |
| JP | 02-172657 | 7/1990 | | |
| JP | 02172657 A | * 7/1990 | ........... | B23Q/35/04 |
| JP | 04-203917 | 7/1992 | | |
| JP | 04203917 A | * 7/1992 | ........... | G01B/21/00 |
| JP | 04-248409 | 9/1992 | | |
| JP | 4-299206 A | 10/1992 | | |
| JP | 2748702 | 5/1998 | | |
| JP | 10-170243 A | 6/1998 | | |

* cited by examiner

*Primary Examiner*—John Barlow
*Assistant Examiner*—Xiuqin Sun
(74) *Attorney, Agent, or Firm*—Pearne & Gordon LLP (57) ABSTRACT

A stylus having a curvature radius of 1 mm or less is attached to the extremity of a probe. When the profile of an object is measured with high precision by causing the stylus to follow a measurement surface of the object, a reference ball for calibration is first measured, thereby surface profiling the object. From the measurement data, a contact position where the stylus contacts with the object is determined. A positional error caused by a curvature radius of the stylus is corrected by using an angle of inclination of the measurement surface in that contact position. The amount of profile error in the contact position is extracted by using the profile error data pertaining to the stylus determined by measurement of the reference ball. The amount of profile error is added to the measurement data, thereby correcting the profile error caused by the curvature radius of the stylus.

16 Claims, 8 Drawing Sheets

PROFILOMETER AND METHOD FOR MEASURING, AND METHOD FOR MANUFACTURING OBJECT OF SURFACE PROFILING

BACKGROUND OF THE INVENTION

1. Field of the Invention

The present invention relates to a profilometer and method for measuring, with high precision, the surface profile of an ultra-small area; for example, the surface profile of a pickup lens of an optical disk, that of a small-diameter lens to be used in optical communication, such as a fiber condenser lens, or that of a mold for the lens.

2. Description of the Related Art

Figure 1:
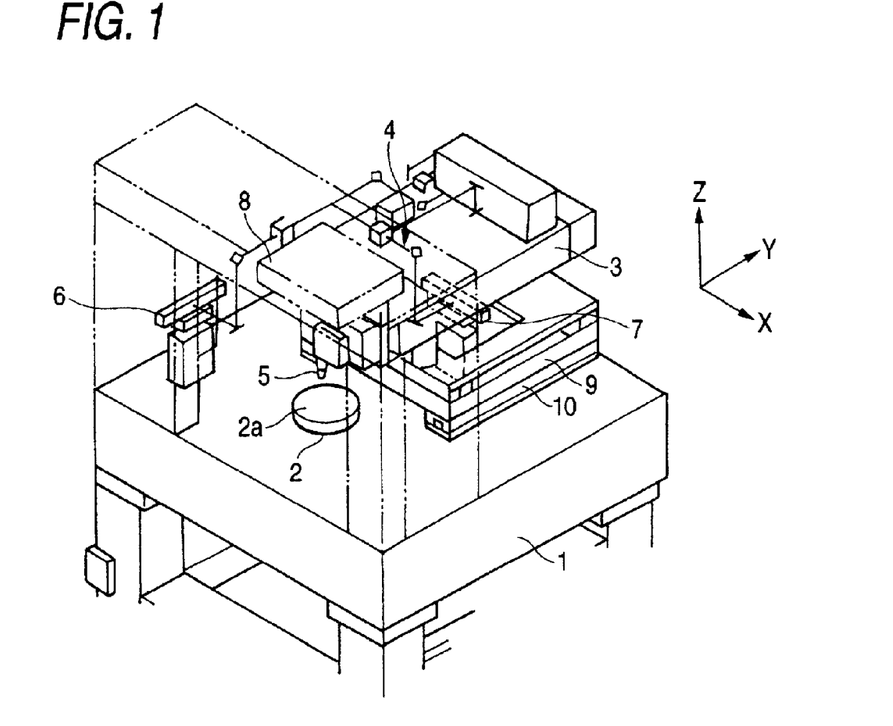
FIG. 1 is a perspective view showing one example configuration of a profilometer.

Japanese Patent Application Laid-Open Nos. H04-299206, H10-170243, and Japanese Patent No. 2748702 describe an ultrahigh precision three-dimensional profilometer capable of measuring the surface profile of an aspheric lens or that of a mold for the lens. In the three-dimensional surface profiling method, there are some kinds of method; for example, a method to directly contact to an object by a probe, a measurement method using an optical probe and utilizing a behavior of an optical interference, or such. The Japanese Patent No. 2748702 discloses an error correction method by using a reference spherical reference ball in a profilometer including an optical probe. FIG. 1 is a perspective view showing an example construction of the profilometer.

The profilometer is constructed such that a tip end of a stylus 5 attached to a moving element 3 is caused to follow a surface of measurement 2a (hereinafter called a "measurement surface") of an object of measurement 2 (simply called an "object"), such as a lens, placed on a stone surface plate 1, thereby measuring the surface profile of the object 2. More specifically, an X reference mirror 6, a Y reference mirror 7, and a Z reference mirror 8, which are intended for measuring the positional coordinates of the probe 5 by way of a support section, are placed on the stone surface plate 1 on which the object 2 is to be placed. The moving element 3 having the probe 5 attached thereto is equipped with an X stage 9 and a Y stage 10. The moving element 3 and the probe 5 can be scanned in both the X-axis and Y-axis directions by means of following the surface profile of the measurement surface 2a of the object 2. The moving element 3 is equipped with a laser length-measuring optical system 4. By means of a known light interference method, the profilometer measures the X coordinate of the probe 5 with reference to the X reference mirror 6; the Y coordinate of the probe 5 with reference to the Y reference mirror 7; and the Z coordinate of the probe 5 with reference to the Z reference mirror 8.

Measurement procedures for use in such a profilometer will now be described. First, design information, such as an equation representing the design profile of the measurement surface 2a of the object 2, is input to the profilometer before measurement. Next, the probe 5 is caused to follow the measurement surface 2a of the object 2 at a constant measurement pressure. Centering of the object 2 is effected, by means of causing the probe 5 to perform axial scanning in the X and Y directions. Details on the centering operation are described in Japanese Patent Application Laid-Open No. 254307/1990. Subsequently, the probe 5 actually scans the measurement surface 2a of the object 2 in the X and Y directions, thereby measuring the profile of the surface.

Figure 10:
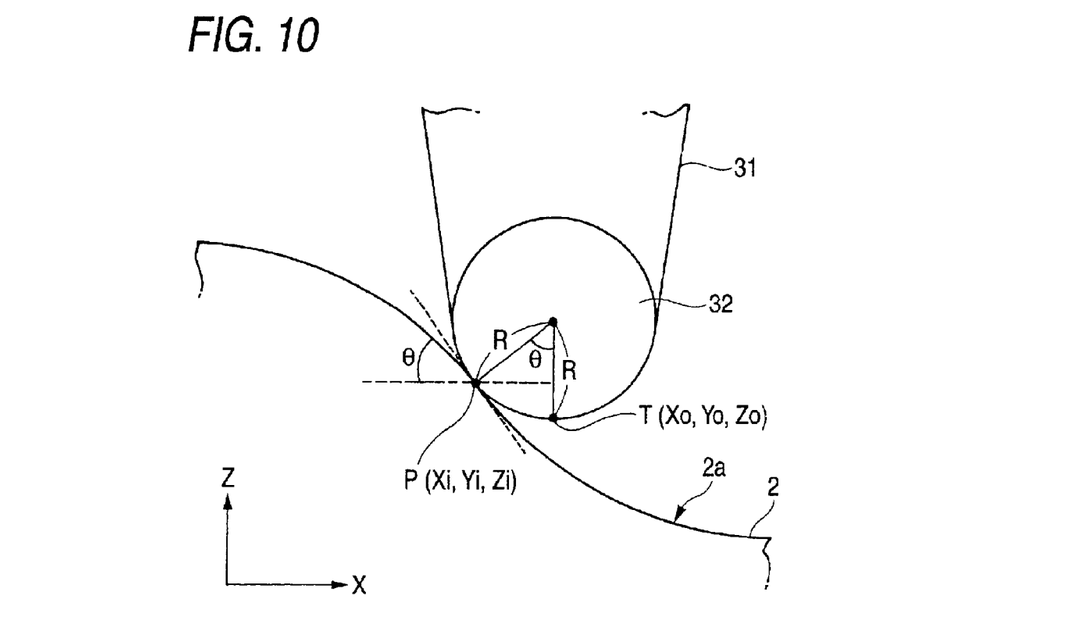
FIG. 10 is a descriptive view showing the manner in which the probe provided at the extremity of the probe of the profilometer follows a measurement surface of the object.

FIG. 10 shows a view of how a stylus 31 provided at the extremity of the probe 5 of the profilometer follows the measurement surface 2a of the object 2, when enlarged in the Z and X coordinates. Three-dimensional coordinates detected by the stylus 31 correspond to coordinates (X0, Y0, Z0) of the tip end T of the stylus 31 shown in FIG. 10. However, as illustrated, a tip end section 32 of the stylus 31 has a curvature radius R. When the tip end section 32 is following the surface profile of the object 2, a measurement error arises between three-dimensional coordinates (Xi, Yi, Zi) of an actual point of measurement P and the coordinates (X0, Y0, Z0) of the tip end T of the stylus 31 obtained as a result of scanning operation of the probe 5.

If the inclination angle θ of the measurement surface 2a at the actual position of point P of measurement is known, coordinates (Xi, Yi, Zi) of the actual point P of measurement can be computed from the coordinates (X0, Y0, Z0) of the tip end T of the stylus 31. A measurement error derived from the curvature radius R of the tip end section 32 of the stylus 31 can be corrected by means of subtracting or adding the position of actual point P of measurement relative to the tip end T of the stylus 31 (i.e., a relative distance between two coordinates).

In connection with the Z-X coordinates, provided that coordinates of the tip end T of the stylus 31 belonging to the probe 5 assume (X0, Y0, Z0); that coordinates of an actual point P of measurement assume (Xi, Yi, Zi); and that the angle of inclination of the measurement surface 2a in the X direction assumes θx, then (Xi, Yi, Zi)=(X0−R·sin θx, Y0, Z0+R, (1−cos θx)) (where coordinate components Yi, Y0 in the Y direction in the Z-X coordinates are indefinite). Similarly, if the inclination angle θ of the measurement surface 2a in the Y direction at the actual position of point P of measurement is known, the same correction can be made to the Z-Y coordinates. Correction of such a measurement error (i.e., an R error of the extremity of the probe) derived from the curvature radius R of the tip end section of the stylus belonging to the probe will hereinafter be called probe R correction. The inclination of angle θ obtained at this time can be computed from previously-acquired or subsequently-acquired measurement data. Alternatively, the inclination of angle θ can also be determined by means of the coordinates of the tip end T of the stylus 31 and the design equation of the object 2.

Surface-profiled data pertaining to the object 2 detected by the stylus 21 include a placement error which has arisen at the time of placing of the object 2 (i.e., an alignment error). When occurrence of an error between the surface-profiled data and the input design formula has been determined, the coordinate system is transformed by means of three-dimensionally rotating and translating the data that have been subjected to probe R correction, thereby optimally superimposing the data onto the design equation. As a result, an alignment error is corrected. Subsequently, the probe R correction and the transformation of a coordinate system will be hereinafter collectively referred to as alignment processing.

After alignment processing, there is determined a profile error (deviation) in the Z direction between the input design equation and the measurement data pertaining to the object 2, and deviation data are output. When a large profile error exists between the design equation and the actual object, the deviation data are fed back to a processing machine. Processing is repeated until the actual profile of the object 2 falls within a range of desired precision as compared with the design equation (e.g., a profile error falls within a range of ±0.1 μm in the case of an aspheric pickup lens for use with an optical disk), thereby manufacturing an aspheric lens or a mold thereof; that is, the object 2, with high precision.

In the case of the ultrahigh precision three-dimensional profilometer capable of effecting measurement with high precision on the order of 50 nm or less, the tip end section 32 of the stylus 31 attached to the probe 5 which follows the surface profile of the object 2 is required to assume a high sphericity of 0.02 to 0.03 μm or less and excellent durability against repeated measurement. For this reason, there has widely been employed a ruby ball with an outer diameter of 1 mm or thereabouts which can achieve a high degree of sphericity through mechanical polishing and has superior machinability and hardness characteristics.

In recent years, in the field of optical communication, an optical fiber condenser lens used in a photoelectric transducing device has a small lens diameter of about 2 mm or less and a surface inclination angle of 40° or more. In relation to such an optical fiber condenser lens, a lens-barrel-integrated aspheric surface glass lens into which a lens barrel and a lens are bonded into a single piece at the time of pressing operation has been employed for facilitating handling.

Figure 11:
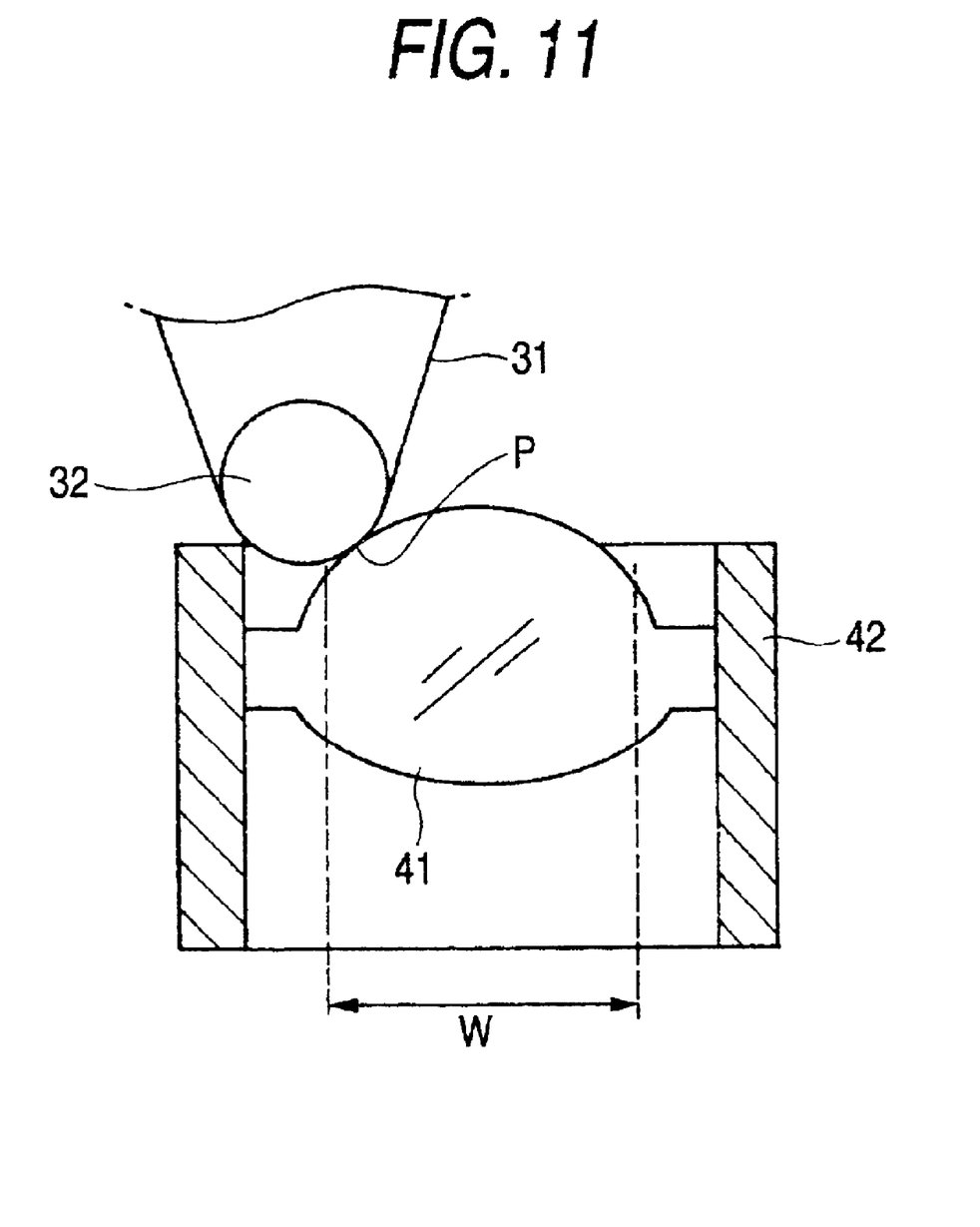
FIG. 11 is a descriptive view showing one example contact status of a related-art stylus obtained when an optical fiber condenser lens is measured through use of the stylus.

FIG. 11 illustrates an example of contact status of the stylus 31 when an optical fiber condenser lens 41 is measured through use of the stylus 31 having the probe 5 attached thereto. The tip end section 32 of the stylus 31 is a ruby ball of about 1 mm. Hence, when the profile of the optical fiber condenser lens 41 having a lens diameter of 2 mm or less is measured, interference arises between the stylus 31 or the ruby ball serving as the tip end 32 thereof, and the lens barrel 42 of the optical fiber condenser lens 41, at the end of an effective diameter W of the lens. There arises a problem of difficulty in measuring the entirety of the effective radius W of the optical fiber condenser lens 41.

In order to measure the entirety of the effective radius W of the optical fiber condenser lens 41, the curvature radius of the tip end section 32 of the stylus 31 must be reduced to several micrometers. At this time, for instance, there is conceived a case where diamond is attached to the stylus 31 in place of the ruby ball of 1 mm and the curvature radius of the tip end of the stylus is made small, to several micrometers, through polishing. In this case, in contrast with a ruby ball, diamond cannot be produced through rolling polishing. Hence, an expert engineer must manually polish diamond. Further, a diamond crystal has orientation, which deteriorates machinability. In consideration of these factors, difficulty is encountered in achieving a desired degree of sphericity. For instance, when the tip end section 32 assumes an open angle of 120° or less, a sphericity of 0.1 μm or thereabouts is obtained or, in a worst case, a sphericity of 0.2 μm or more. Thus, the sphericity of diamond becomes several times or more worse than that of a related-art ruby ball.

When the surface profile of the object 2 is measured through use of the stylus 31 made of diamond of poor sphericity, the low sphericity directly appears in the measurement data as an error in the profile of the object 2, because an error in the profile of the tip end section 32 of the stylus 31 is not corrected through the probe R correction, thereby hindering high-precision measurement.

A higher numerical aperture has recently been pursued even for a small-diameter pickup lens for use with an optical disk. Some of the lenses have an inclination angle of 40° or more. If an attempt is made to measure the surface profile of the lens or the mold therefore by a conventional profilometer with a probe directly attaching to the object, interference arises between the tip end of the stylus and an edge surface. Moreover, if do the same by using a conventional profilometer including an optical probe, the reflected light from the object cannot be acquired enough to profile. Hence, it is hard for the conventional profilometeres to measure the entirety of the effective diameter of the lens and that of the mold. Therefore, a profiling method and apparatus to measure forces between atoms of a probe and an object is suggested. Additionally, if a probe, whose tip portion has smaller diameter than the conventional ruby ball, is applied, it may be possible to profile the object that has an inclination angle of 40° or more with high precision. However, as mentioned above, the diamond ball, which has smaller diameter than the ruby ball, has poor sphericity and the poor sphericity thereof causes the low-precision measurement.

SUMMARY OF THE INVENTION

The present invention has been conceived in view of the foregoing circumstances and aims at providing a profilometer and method which enable high-precision measurement without involvement of interference between the tip end of a stylus and an edge surface of a small-diameter lens or a lens barrel even at time of surface profiling of a small-diameter lens, such as an optical fiber condenser lens used in optical communication or a pickup lens for use with an optical disk or surface profiling of a mold of the lens, as well as a method of manufacturing an object of measurement.

First, the invention provides a profilometer which measures the surface profile of an object of measurement by means of causing an extremity of a probe to follow a measurement surface of the object, comprising:

a probe having a curvature radius of 1 mm or less provided at the extremity of the probe;

curvature correction means for correcting the measurement data pertaining to the object in connection with a positional error stemming from the curvature radius of the probe; and stylus profile correction means which corrects an error in the profile of the probe through use of profile error data pertaining to the probe determined through measurement of an article of reference shape which is to act as a reference for calibration.

Second, the article of reference shape employs a spherical reference ball.

Third, the probe is machined so as to have a tip-end open angle of 55° or less and such that a tip end has a curvature radius on the order of micrometers.

Fourth, the tip end of the probe is made of diamond.

Fifth, the invention provides a surface profiling method for measuring the surface profile of an object of measurement by means of causing a probe to follow a measurement surface of the object, wherein a probe having a curvature radius of 1 mm or less is provided at the extremity of the probe, the method comprising:

a probe shape computation step of determining a profile error stemming from the curvature radius of the probe, by means of measuring a reference ball to be used as a reference for calibration; and a probe shape correction step of correcting measurement data pertaining to the object through use of the stylus profile error data obtained through measurement of the reference ball.

Sixth, the probe shape correction step includes:

a curvature correction step of determining a contact position between the object and the probe and correcting the measurement data pertaining to the object in connection with a positional error stemming from a curvature radius of the probe on the basis of an angle of inclination of the measurement surface in the contact position; and a profile error correction step of extracting the amount of profile error in the contact position from the stylus profile error data and correcting the profile error stemming from the curvature radius of the probe by means of addition or subtraction of the amount of profile error.

Seventh, in the profile error correction step, a position on the reference ball corresponding to the contact position of the probe at the time of measurement of the reference ball is specified through use of the angle of inclination of the measurement surface in the contact position between the probe and the object, and a profile error in a specified position on the reference ball at the time of measurement of the reference ball is extracted and corrected as the amount of profile error in the contact position of the probe.

Eighth, in the profile error correction step, the amount of profile error in the contact position of the probe is determined through interpolation, on the basis of deviation data which have been discretely acquired as the stylus profile error data at the time of measurement of the reference ball and pertain to a design equation.

Ninth, in the profile error correction step, a spline curve is used for interpolating the amount of profile error from the discrete deviation data.

The invention provides a method of manufacturing an object of measurement, comprising:
a deviation detection step of measuring a surface profile of an object of measurement through use of the surface profiling method as defined in any one of claims 5 through 9, thereby producing deviation data pertaining to a design equation of the object; and
a machining step of machining the profile of the object by means of feeding back the deviation data.

According to the invention, when the surface profile of an object of measurement is measured by means of causing a probe to follow a measurement surface of the object, the probe having a small-diameter probe of curvature radius of 1 mm or less provided at the tip end thereof, a profile error stemming from the curvature radius of the probe is determined through measurement of a reference ball to act as a reference for calibration. Measurement data pertaining to the object are corrected by use of stylus profile error data determined through measurement of the reference ball. At this time, a contact position between the object and the probe is determined, and the positional error stemming from the curvature radius of the probe is corrected on the basis of an angle of inclination of the measurement surface in the contact position. Further, the amount of profile error in the contact position is extracted from the stylus profile error data, and the profile error stemming from the curvature radius of the probe is corrected by addition or subtraction of the amount of profile error.

As a result, the profile error of the probe determined through measurement of the reference ball has been taken into consideration beforehand, and the error can be reflected in measurement data. Consequently, there can be provided accurate measurement data which have been appropriately calibrated in connection with the profile of the object. The surface profile of a small-size lens, such as an optical fiber condenser lens for use in the field of optical communication or a pickup lens for use with an optical disk, or the surface profile of a mold of the lens can be measured without the extremity of a probe interfering with an edge surface or lens barrel of the small-diameter lens. For example, the entire effective range of the lens can be measured with a high precision of 50 nm or less.

DETAILED DESCRIPTION OF THE PREFERRED EMBODIMENTS

An embodiment of the invention will be described hereinbelow by reference to the drawings.

Figure 2:
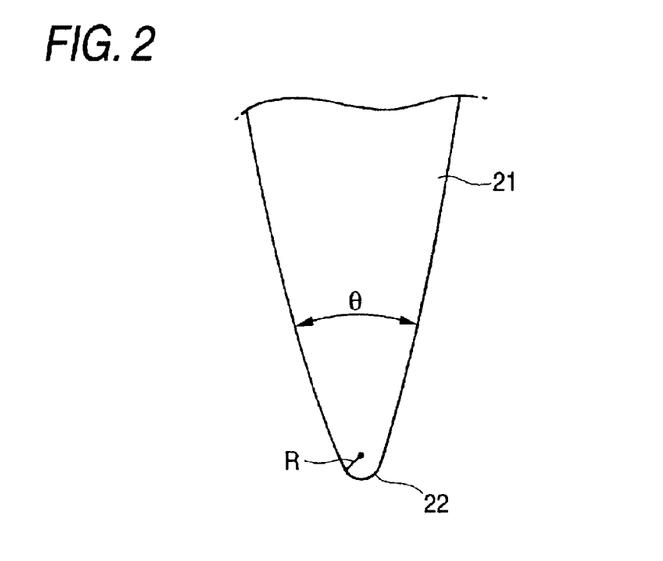
FIG. 2 is a descriptive view showing the dimensions and profile of an extremity of a probe for use with a profilometer according to an embodiment.
Figure 3:
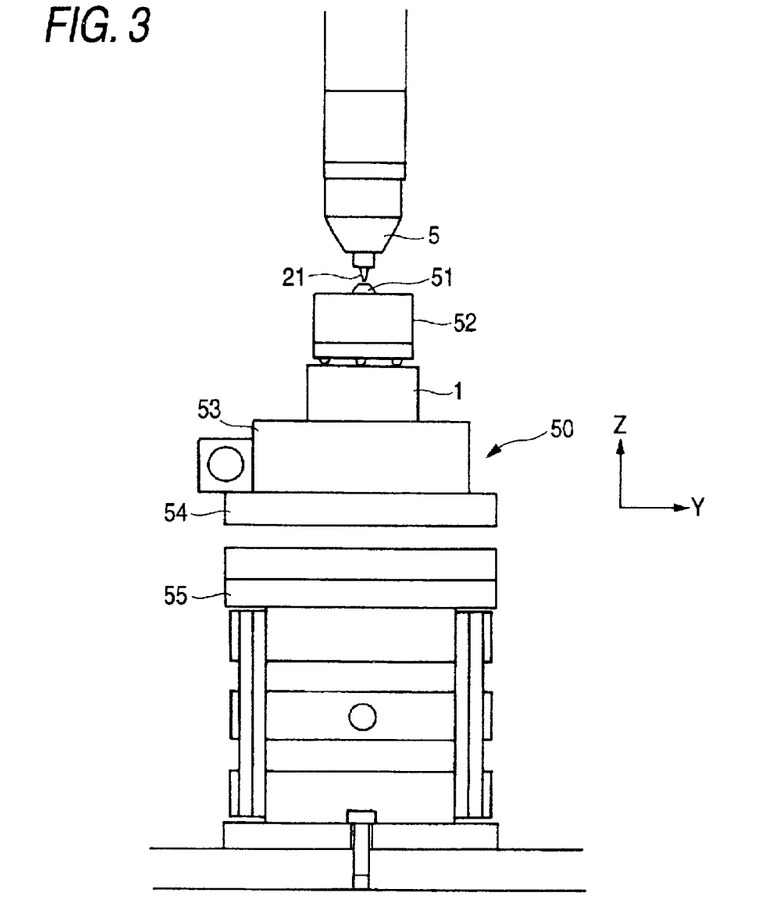
FIG. 3 is a side view showing the profilometer at the time of measurement of a reference ball according to the embodiment.
Figure 4:
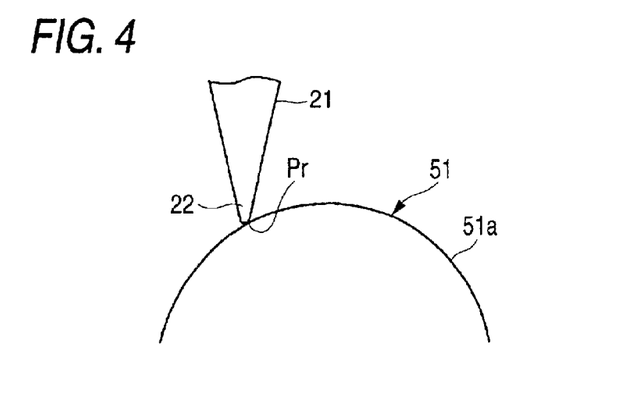
FIG. 4 is a descriptive view showing a contact status of the extremity of the probe at the time of measurement of the reference ball according to the embodiment.

FIG. 1 is a perspective view showing an example construction of a profilometer. FIG. 2 is a descriptive view showing a dimensional profile of a tip end of a stylus used in a profilometer according to the embodiment. FIG. 3 is a side view showing the profilometer at the time of measurement of a reference ball according to the embodiment. FIG. 4 is a descriptive view showing a contact status of the tip end of the stylus at the time of measurement of a reference ball.

In the present embodiment, prior to surface profiling of an object of measurement, the profilometer measures a reference ball formed with a high degree of sphericity so as to act as a calibration reference to be used for correcting errors in the profile of the stylus, while the diamond machined to a small curvature radius is used as a stylus (probe) to be attached to a tip end of a probe.

As shown in FIG. 1, the profilometer enables ultrahigh-precision, three-dimensional measurement on the order of 50 nm or less. The profilometer is constructed such that a tip end of a probe 5 attached to a moving element 3 is caused to follow a surface of measurement 2a (hereinafter called a "measurement surface") of an object of measurement 2 (simply called an "object"), such as a lens, placed on a stone surface plate 1, thereby measuring the surface profile of the object 2.

Specifically, an X reference mirror 6, a Y reference mirror 7, and a Z reference mirror 8, which are intended for measuring the positional coordinates of the probe 5 by way of a support section, are placed on a stone surface plate 1 on which the object 2 is to be placed. The moving element 3 having the probe 5 attached thereto is equipped with an X stage 9 and a Y stage 10. The moving element 3 and the probe 5 can be scanned in both the X-axis and Y-axis directions by means of following the surface profile of the measurement surface 2a of the object 2. The moving element 3 is equipped with a laser length-measuring optical system 4. By means of a known light interference method, the profilometer measures the X coordinate of the probe 5 with reference to the X reference mirror 6; the Y coordinate of the probe 5 with reference to the Y reference mirror 7; and the Z coordinate of the probe 5 with reference to the Z reference mirror 8. Although unillustrated, the profilometer is equipped with control means having a processor and memory for controlling scanning action of the probe 5 and processing of measurement data. Measurement procedures to be described later are carried out as a result of the control means of the profilometer having performed operation control.

A cone-shaped stylus 21, such as that shown in FIG. 2, is attached to the tip end of the probe 5. The stylus 21 is formed from diamond machined such that a tip end 22 assumes a curvature radius R on the order of several micrometers. The stylus 21 is formed into a cone shape having a tip-end open angle θ of about 35° to 45°. Alternatively, the tip-end open angle θ may assume a value of 45° or higher. However, when an object having an inclination angle of 60° or higher is measured, there may arise a case where the side surface of the stylus 21 interferes with a measurement surface, thereby hindering correct surface profiling of the object. Hence, the tip-end open angle preferably assumes a value of 55° or less, more preferably a value of 35° to 45° or thereabouts.

After the stylus 21 has been attached to the extremity of the probe 5, surface profiling of the reference ball is first performed. As shown in FIG. 3, a reference ball 51 is placed on a setup jig section 50 including a stone surface plate 1. The reference ball 50 is placed such that substantially an upper hemisphere of the ball remains exposed on a base 52, wherein three legs are projectingly provided on the bottom of the base 52. Thus, the reference ball 51 is placed on the stone surface plate 1 while being supported at three points. The setup jig section 50 is provided with, in order from the top, a rotary stage 53, a tilt adjustment stage 54, and a Z movement stage 55, and is fixed in a setup space of the profilometer.

The reference ball 51 is usually constituted of a steel ball or a ceramic ball. Since the exterior surface of the reference ball is spherical, the amount of deviation in actual profile of the ball from a design equation can be evaluated by means of an interferometer. Thus, a reference ball having a sphericity of 0.02 μm or less can be produced. In the embodiment, in order to calibrate an error existing between the profile of the tip end section 22 of the stylus 21 made of diamond and the design curvature radius R, the reference ball 51 having such a highly-precise profile is used. As shown in FIG. 4, the tip end section 22 of the stylus 21 is caused to follow an exterior surface of the reference ball 51, thus surface profiling the reference ball 51.

Figure 5:
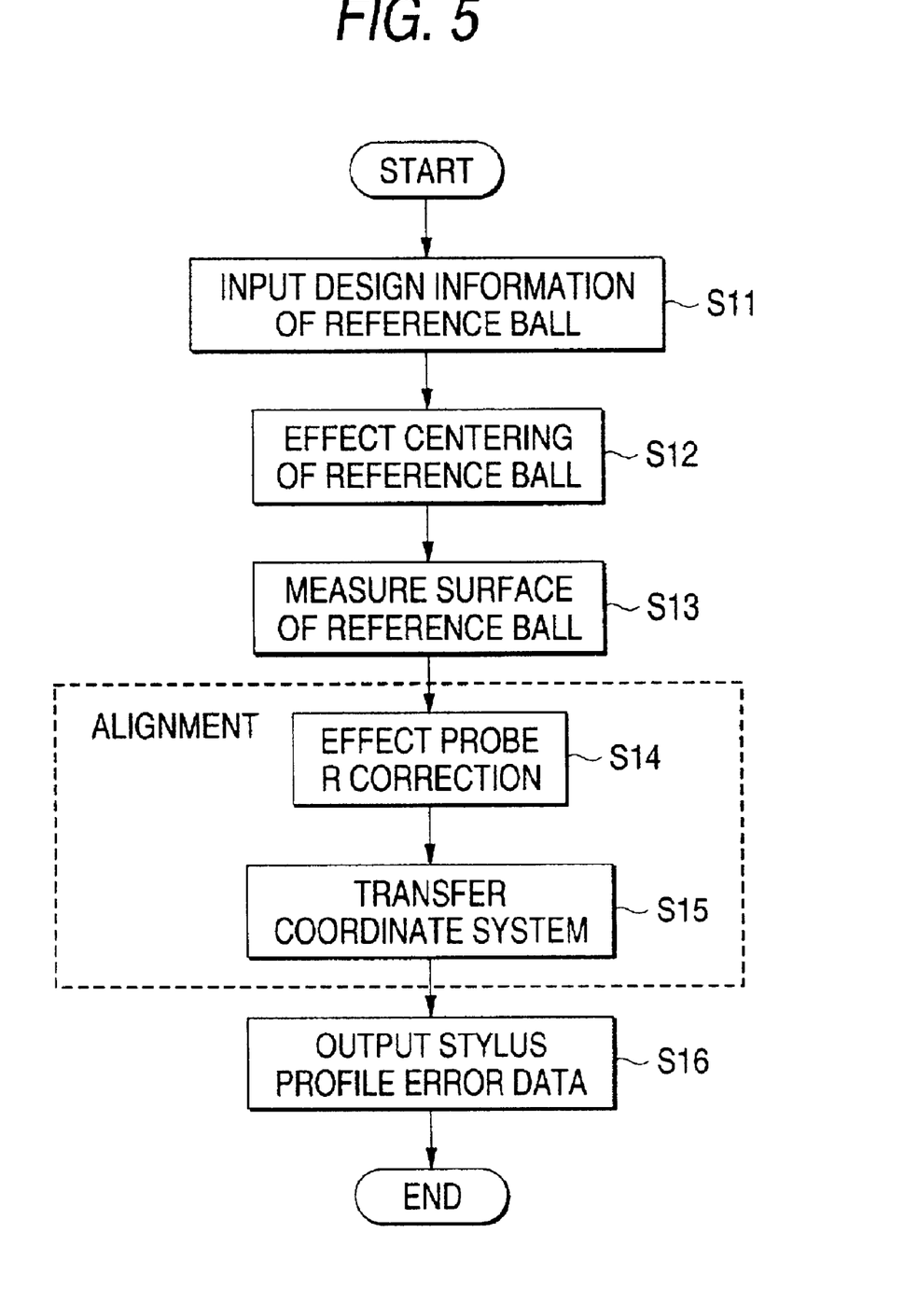
FIG. 5 is a flowchart showing procedures for measuring the surface profile of the reference ball through use of a stylus according to the embodiment.

FIG. 5 is a flowchart showing procedures for measuring the surface profile of the reference ball 51 through use of the stylus 21. First, design information, such as an equation representing a measurement surface 51a of the reference ball 51, the ball being an object of measurement for calibration purpose, is input to the profilometer (step S1). Next, the stylus 21 attached to the probe 5 is caused to follow the measurement surface 51a of the reference ball 51 at a given measurement pressure, and centering of the reference ball 51 is effected, by means of causing the probe 5 to perform an axial scanning operation in the X and Y directions (step S12). The method described in Japanese Patent Application Laid-Open No. 254307/1990 is preferably used in connection with the centering operation. Subsequently, the measurement surface 51a of the reference ball 51 is actually subjected to surface profiling operation by means of causing the probe 5 to perform plane scanning operation in the X and Y directions (step S13).

As in the case of the related art, there is performed correction of a measurement error derived from the curvature radius R of the tip end section 22 of the stylus 21 (i.e., an R error of the extremity of the probe); that is, probe R correction (step S14). As a result, a positional error between the tip end T of the stylus 21 and an actual point Pr of measurement (the position where the tip end section 22 of the stylus 21 is in contact with the measurement surface 51a of the reference ball 51) is corrected. The coordinate system is transformed by means of three-dimensionally rotating and translating the data that have been subjected to probe R correction, thereby optimally superimposing the reference ball 51 onto the design equation. As a result, an alignment error having arisen at the setup of the reference ball 51 is corrected (step S15). Subsequently, after alignment processing involving the probe R correction and the transformation of a coordinate has been performed, there is determined a profile error (deviation) between the input design equation relating to the reference ball 51 and the measurement data, and deviation data are output as stylus profile error data (step S16).

Figure 6:
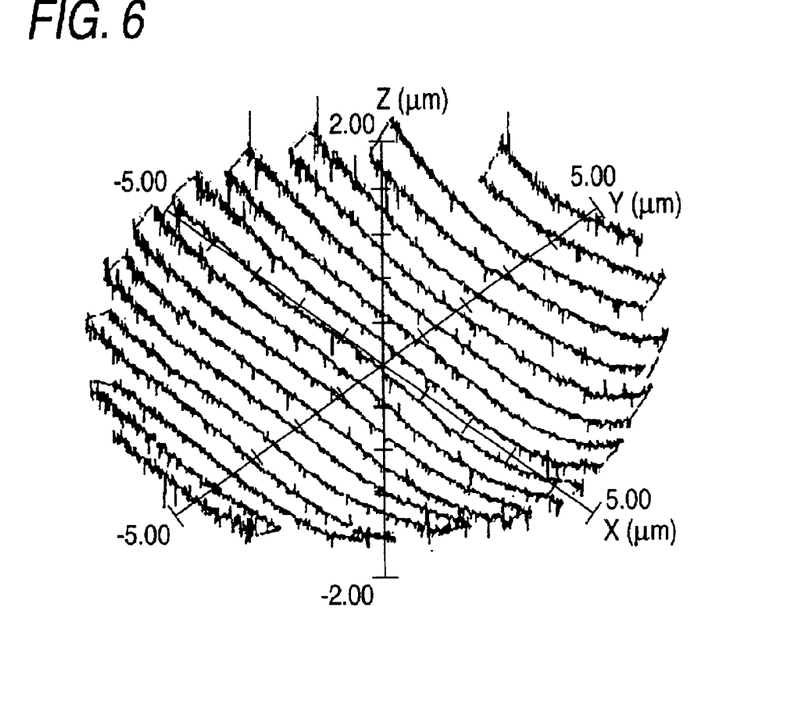
FIG. 6 is a graph showing stylus profile error data obtained when the reference ball for calibration purpose is measured with a stylus which has a tip end section of small diameter and made of diamond.

FIG. 6 is a graph showing stylus profile error data obtained when the reference ball 51 (formed from $Si_3N_4$ and having a design radius Rm of 5.55587 mm) for calibration purpose has been measured through use of the stylus 21 which is made of diamond and whose tip end has a curvature radius of 2 μm. The deviation data shown in FIG. 6 represent discrete measurement data acquired by the profilometer through position detection operation, by means of linking together the data sets through use of straight lines in the sequence in which the data have been acquired. The deviation data represent a difference between the design equation related to the reference ball 51 and actual measurement data; that is, an error (deviation) between the profile of the measurement surface 51a of the reference ball 5 and the design equation. In fact, as mentioned previously, the reference ball 51 has no substantial profile error, and hence the resultant deviation data correspond to stylus profile error data representing an error between the profile of the tip end section 22 of the stylus 21 and a design value.

When an object is actually subjected to surface profiling by means of plane scanning operation of the stylus 21, the stylus profile error data that have been acquired beforehand through measurement of the reference ball are added to measurement data during the course of a probe R correction operation, thus correcting the measurement data. The profile of the tip end of the stylus 21 is thus corrected.

Figure 12:
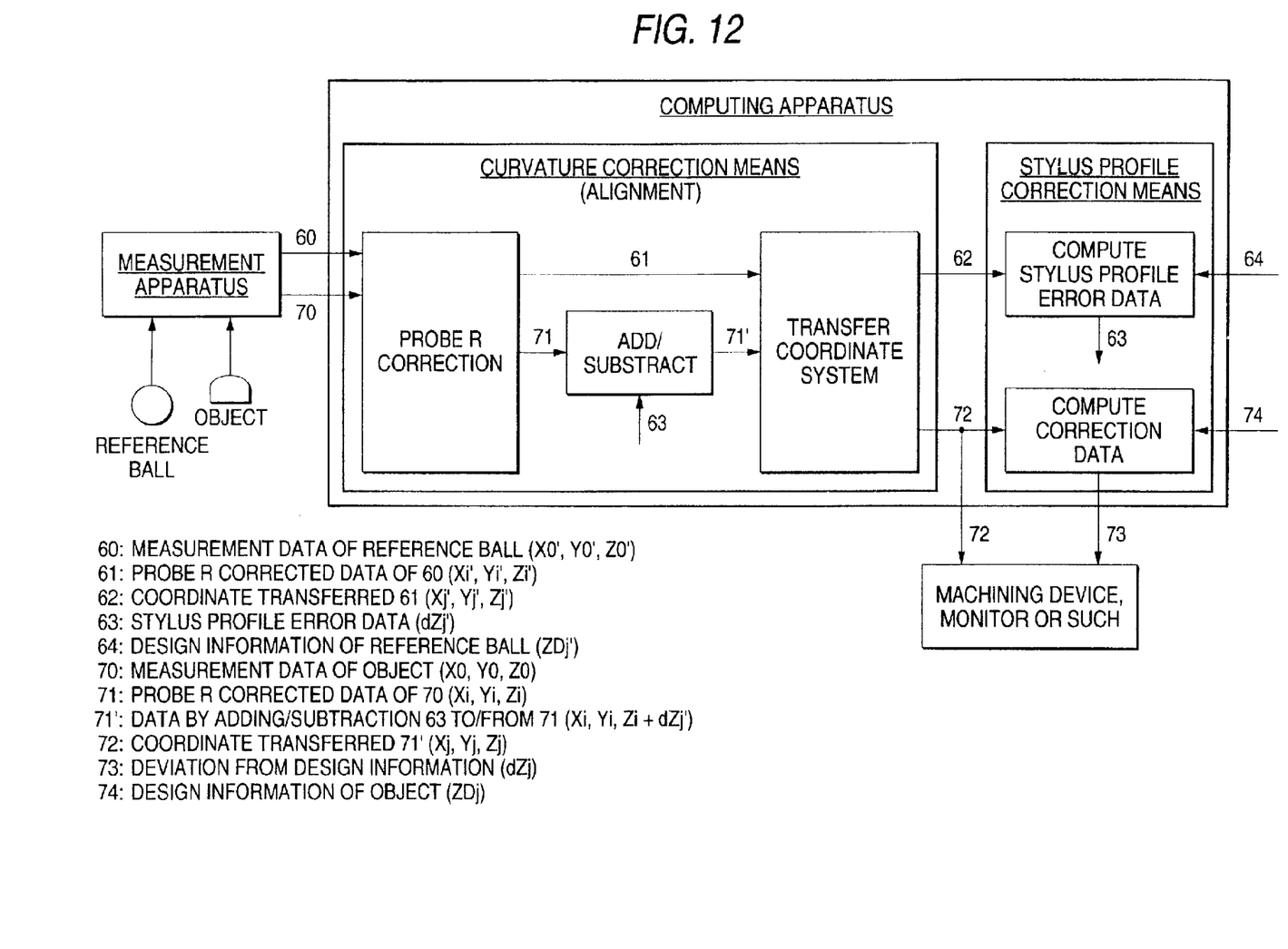
FIG. 12 is a block diagram showing a flow of measured 3-demensional data in the profilometer of the preferred embodiment of the present invention.

The flow of processing the three-dimensional measurement data is showed in FIG. 12.

Figure 7:
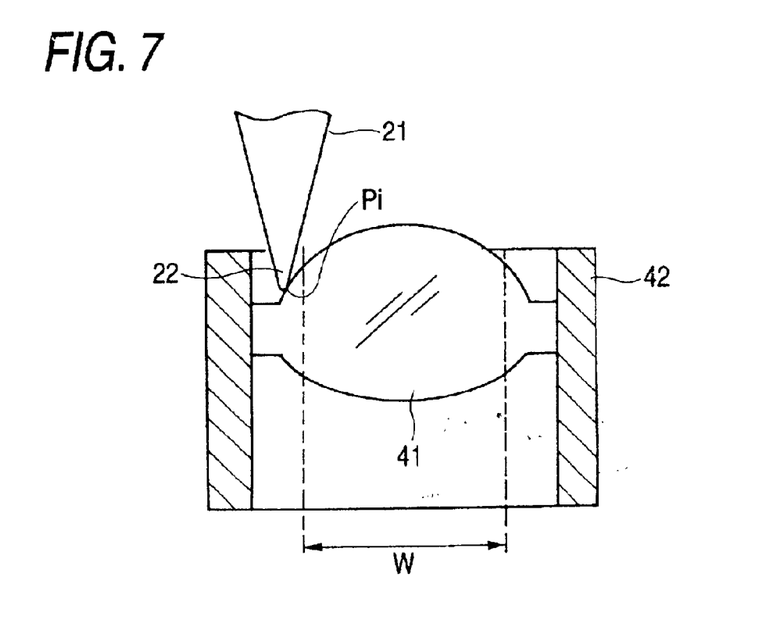
FIG. 7 is a descriptive view showing an example contact status of a stylus obtained when an optical fiber condenser lens is measured through use of a stylus according to the embodiment.
Figure 8:
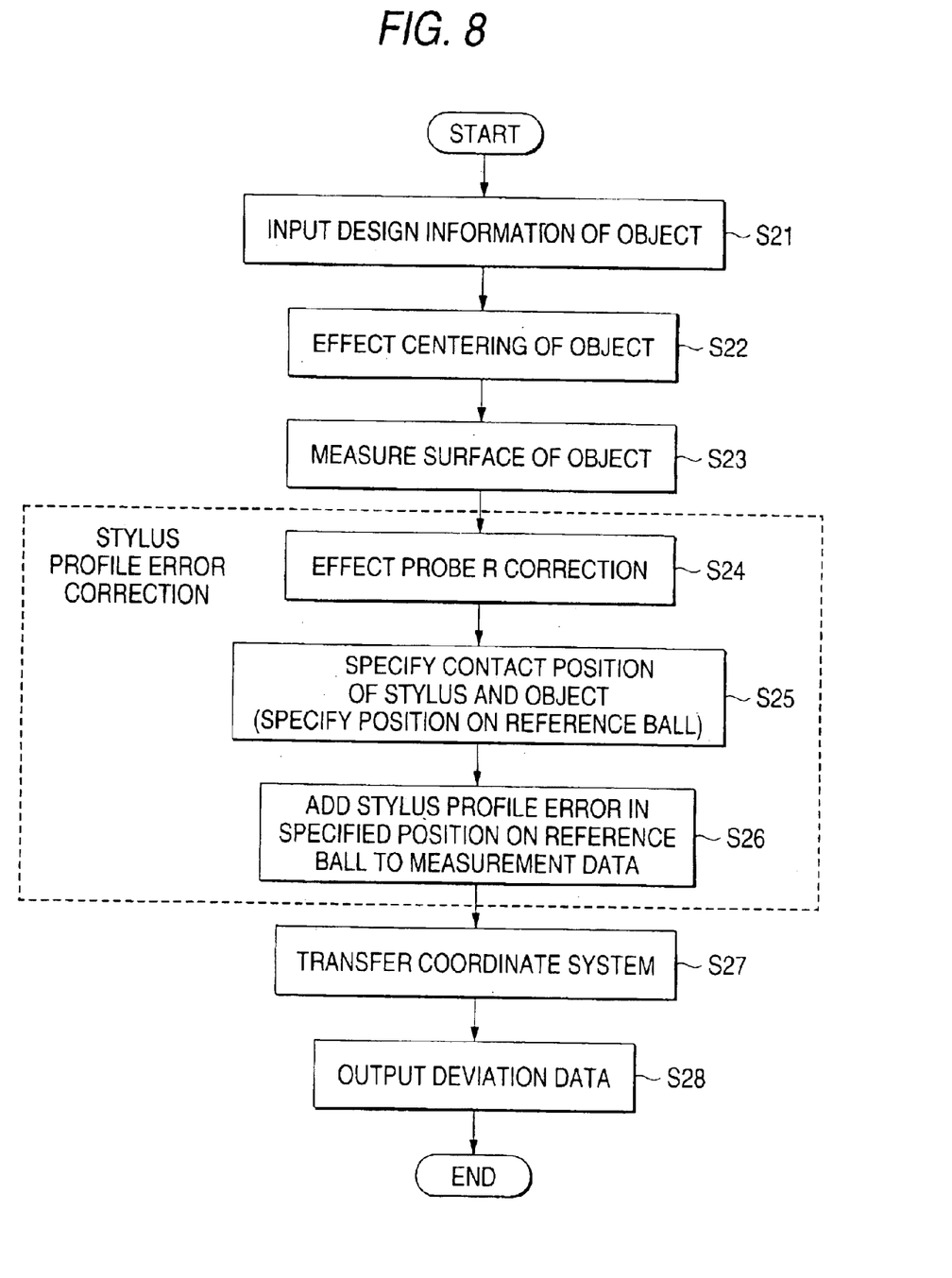
FIG. 8 is a flowchart showing procedures for measuring the profile of an object of measurement, including correction of a profile error of the stylus.

Procedures for correcting an error in the profile of the tip end section 22 of the stylus 21 through use of the stylus profile error data determined through measurement of the reference ball will be described by means of applying the procedures to an actual example of measurement. FIG. 7 is a descriptive view showing an example contact status of the stylus 21 arising when an optical fiber condenser lens 41 is measured through use of the stylus 21 according to the embodiment. FIG. 8 is a flowchart showing procedures for measuring the profile of an object including correction of a profile error of the stylus.

First, the stylus 21 attached to the probe 5 is caused to follow a measurement surface of an object desired to be measured, thereby measuring the surface profile of the measurement surface. At this time, when the optical fiber condenser lens 41 having a lens diameter of 2 mm or less is subjected to surface profiling, the entirety of the effective radius W of the lens 41 cannot be measured by the related-art ruby ball whose tip end has a curvature radius of 1 mm or thereabouts. In contrast, the narrow-diameter, cone-shaped stylus 21 according to the embodiment whose tip end section has a curvature radius of several micrometers can measure the entire range of the lens effective diameter W, because the tip end section 21 does not interfere with a lens barrel 42 of the optical fiber condenser lens 41, as shown in FIG. 7.

Simultaneous with measurement of the reference ball, the design information, such as a design equation relating to the measurement surface 2a of the object 2, is input to the profilometer (step S21). Next, the stylus 21 attached to the probe 5 is caused to follow the measurement surface 2a of the object 2 at a predetermined measurement pressure.

The object 2 is subjected to centering by means of causing the probe 5 to perform an axial scanning operation in the X and Y directions (step S22). Subsequently, the probe 5 is caused to actually perform plane scanning of the measurement surface 2a of the object 2, thus surface profiling the object 2 (step S23).

As in the case of measurement of the reference ball, the thus-obtained measurement data pertaining to the object 2 are subjected to probe R correction, thereby eliminating a measurement error derived from the curvature radius R of the tip end section 22 of the stylus 21 (i.e., an R error of the extremity of the probe) (step S24). As a result, a positional error between the tip end T of the stylus and the actual point Pi of measurement (i.e., a position where the tip end section 22 of the stylus 21 comes into contact with the optical fiber condenser lens 41 serving as the object 2) is calculated.

The measurement data that have been subjected to probe R correction are subjected to correction in connection with the profile error (stylus profile error data) stemming from the tip end section 22 of the stylus 21, the error having been determined beforehand through measurement of the reference ball. Here, when an object other than the reference ball for calibration purpose is subjected to surface profiling, the measurement data that have been subjected to probe R correction are corrected through use of the stylus profile error data. Correction cannot be performed appropriately, unless the portion of the tip end 22 of the stylus 21 having remained in contact with the measurement surface 2a of the object 2 is specified and the profile error shown in FIG. 6 corresponding to the thus-specified position of contact Pi (i.e., point of measurement) is added to the measurement data. Therefore, the contact position Pi where the stylus 21 is in contact with the object 2 is first specified, and there are specified coordinates Pr on the reference ball corresponding to the contact point at the time of measurement of the reference ball (step S25).

At the time of the probe R correction performed in step S24, there are determined an inclination angle θx in the X direction and an inclination angle θy in the Y direction in connection with the point of measurement where the measurement surface 2a of the object 2 comes into contact with the tip end section 22 of the stylus 21. As a result of use of information about the inclination angles, there can be uniquely specified the contact position Pi on the stylus 21 used for surface profiling—where the stylus is in contact with the object 2—and the position Pr on the reference ball corresponding to the contact position at the time of measurement of the reference ball. In other words, on the basis of the inclination angles of the measurement surface at the point of measurement determined during probe R correction, there can be specified the position of the point of measurement on the reference ball where the stylus comes into contact with the reference ball when the same inclination angles are obtained during measurement of the reference ball; that is, the position on the reference ball where the stylus comes into contact with the reference ball when the inclination angles are obtained. Consequently, there is defined a correspondence between the position on the stylus 21 where the stylus is in contact with the object 2 during actual surface profiling operation and the position on the reference ball which comes into contact with that position on the stylus 21 during measurement of the reference ball. An appropriate amount of profile error in connection with that specific position can be extracted from the stylus profile error data for calibration purpose.

More specifically, the X position on the reference ball can be specified as $X = Rm \cdot \sin \theta x$ from the inclination angle $\theta x$ in the X direction determined during probe R correction operation. For instance, the inclination angle $\theta x$ in the X direction is 30° (i.e., an angle of inclination of the measurement surface 2a of the object 2 is 30°), there is derived $X = 5.55587 \times \sin 30° = 2.778$ mm. The profile error of the reference ball in the X position is added to measurement data as the amount of error in the profile of the tip end section 22 of the stylus 21, thus correcting measurement data. In this case, two positions where an inclination angle of 30° is obtained are available with respect to the X axis. One of these X positions can be specified, so long as the inclination angles are assigned signs. Similarly, a Y position on the reference ball is also specified.

In connection with the thus-specified positions (X, Y) on the reference ball, a profile error of the reference ball in these specific positions; that is, the amount of error in the stylus in the positions, is extracted by reference to the stylus profile error data which have been determined through measurement of the reference ball and are shown in FIG. 6. The amount of stylus profile error is added to each of the points in the measurement data that have undergone probe R correction, thereby correcting the profile error stemming from the curvature radius of the tip end section 22 of the stylus 21 (step S26).

Here, the stylus profile error data may be held as correction values corresponding to the respective positions on the reference ball. Alternatively, the data may be held as correction values corresponding to respective positions on the tip end of the stylus. In this case, after the probe R correction, the amount of stylus profile error corresponding to the position of the point of measurement of the probe Remaining in contact with the object can be corrected by means of reading, directly from data, the amount of profile error determined beforehand by means of measurement of the reference ball.

As mentioned above, the amount of probe R correction to be applied to the measurement surface 2a of the object 2 and the amount of error in the profile of the tip end section 22 of the stylus 21 computed through measurement of the reference ball corresponding to the actual point P of measurement are added to measurement data. As a result, there can be accurately performed correction of a measurement error, including correction of the profile error stemming from the curvature radius of the tip end section 22 of the stylus 21, thereby enabling high-precision measurement.

After correction of the stylus profile error including probe R correction performed in steps S24 to S26, the corrected data are three-dimensionally rotated and translated, thereby transforming the coordinate system, as in the case of the measurement of the reference ball. As a result, the measurement data are optimally superimposed on the design equation of the object 2, thereby correcting the setup error having arisen at the time of setup of the object 2 (i.e., an alignment error) (step S27). There is determined a profile error (i.e., deviation) between the input design equation of the object 2 and the measurement data, and the resultant deviation data are output (step S28).

The deviation data determined through such surface profiling operation are fed back to, e.g., a processing machine. The profile of an actual object is compared with the design equation, and processing operation is repeated until precision falls within a desired range. For instance, in the case of an aspheric pickup lens for use with an optical disk, processing operation is repeated until a profile error falls within a range of 0.1 $\mu$m, thereby processing the profile of the object. As a result, high-precision profile processing becomes feasible.

Figure 9:
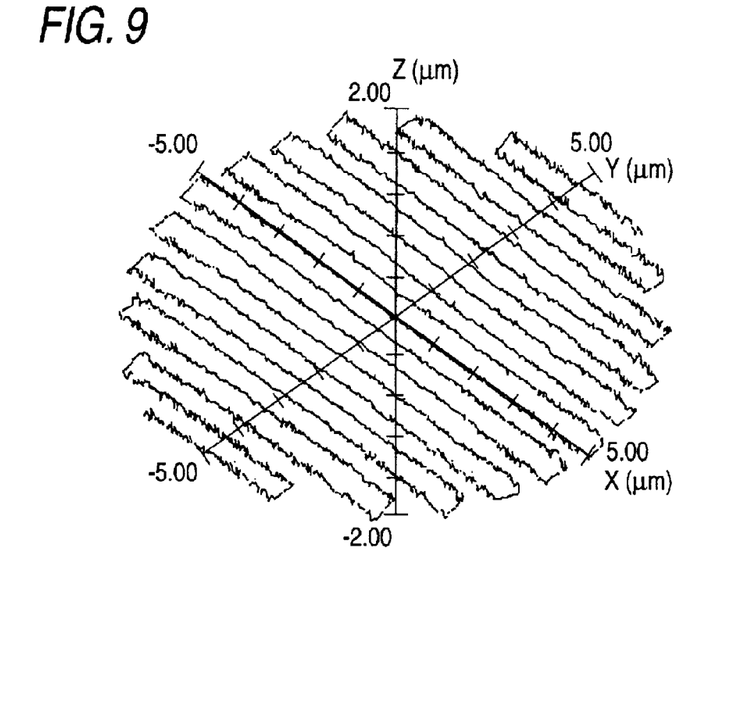
FIG. 9 is a graph showing profile error data output as a result of the reference ball having been measured with addition of stylus profile error correction processing.

Even when diamond of extra-small diameter is used in the tip end section of the stylus, the foregoing measurement procedures enable high-precision surface profiling of an object. FIG. 9 is a graph showing profile error data output as a result of the reference ball having been measured with addition of the stylus profile error correction processing. The graph includes no substantial errors when compared with the graph shown in FIG. 6. Hence, it is understood that profile measurement of the reference ball has been measured correctly. In this case, at the time of measurement of an actual object through use of a stylus of small diameter, a measurement error can be corrected more accurately, by means of correcting an error in the profile of the stylus on the basis of profile error data pertaining to the tip end section of the stylus determined through measurement of a reference ball, as well as by means of correcting an R error of the extremity of a probe and an alignment error in such a manner as mentioned in connection with the procedures.

During the course of a process for determining a profile error stemming from the curvature radius of the tip end section 22 of the stylus 21 in the measurement procedures, measurement is performed while measurement data are spaced at substantially uniform intervals in both the X and Y directions. Further, the equidistant lattice data are subjected to interpolation by means of, e.g., a known spline curve, thus forming a profile error curve. As a result, stylus profile error data pertaining to a location distant from the discrete data can be estimated from discrete data pertaining to a lattice-shaped profile error around the position. Here, as mentioned above, the measurement data do not necessarily need to be spaced at uniform intervals in both the X and Y directions. Correction data my be prepared from the acquired discrete data so that they can be readily corrected.

The thus-determined stylus profile error data are preferably stored in storage means in the format of a DLL (dynamic link library) for an apparatus using an operating system; e.g., Windows, so that control means of the profilometer can arbitrarily refer to the data.

The surface profiling method according to the embodiment is longer than the related-art method in terms of the number of operating processes; that is, a process for measuring a reference ball is added. However, measurement of a reference ball and computation of a profile error (deviation) also double as daily check of the profilometer. Hence, even in the case of ordinary measurement, such a check is to be performed by the first operator. Hence, no substantial change arises in operator's tasks. If an operator performs surface profiling operation through use of another stylus made of diamond, it goes without saying that an object must be subjected to surface profiling only after a profile error of the stylus has been determined again by means of measurement of the reference ball.

As mentioned above, according to the profilometer and method of the embodiment, even during measurement of the surface profile of a small-diameter lens, such as a pickup lens for use with an optical disk or an optical fiber condenser lens used for optical communication, that of a lens barrel, or that of a mold of the lens, a stylus provided at the extremity of a probe does not interfere with an edge surface or lens barrel of the small-diameter lens, and measurement can be performed by means of correcting a profile error of the stylus. Hence, high-precision measurement can be performed. Therefore, there can be measured a small-diameter lens having an inclination angle about 60° of high numerical aperture or a mold thereof, which hitherto has been impossible to measure.

However, only the profilometer including the stylus having curvature radius of a few $\mu$m, is mentioned in the explanation of the preferred embodiments, it is possible to apply both of the curvature correction means and the stylus profile correction means in the present invention to a profilometer including a stylus having curvature radius of about 1 mm. By applying those correction means, the profilometer including the stylus having curvature radius of about 1 mm and a poor sphericity can output a high-precise measurement data as well as the profilometer including a stylus having curvature radius of the same and a high sphericity.

As has been described, the present invention yields an advantage of the ability to perform high-precision surface profiling of a small-diameter lens, such as an optical fiber condenser lens used in the field of optical communication or a pickup lens used with an optical disk, and that of a mold thereof without the extremity of a probe interfering with an edge surface or lens barrel of the small-diameter lens.

What is claimed is:

1. A profilometer for measuring the surface profile of an object of measurement by means of causing an extremity of a probe to follow a measurement surface of the object, comprising:

a stylus having a curvature radius of 1 mm or less provided at the extremity of the probe;

curvature correction means for correcting the measurement data pertaining to the object in connection with a positional error stemming from the curvature radius of the probe;

stylus profile correction means which corrects an error in the profile of the stylus through use of profile error data pertaining to the stylus determined through measurement of an article of reference shape which is to act as a reference for calibration; and coordinate conversion means which three-dimensionally rotates and translates said measurement data corrected by said curvature correction means and stylus profile correction means.

2. The profilometer according to claim 1,
wherein the article of reference shape employs a spherical reference ball.

3. The profilometer according to claim 2,
wherein the stylus is machined so as to have a tip-end open angle of 55° or less and such that a tip end has a curvature radius on the order of micrometers.

4. The profilometer according to claim 1,
wherein the stylus is machined so as to have a tip-end open angle of 55° or less and such that a tip end has a curvature radius on the order of micrometers.

5. The profilometer according to claim 4,
wherein the tip end of the stylus is made of diamond.

6. A method for measuring the surface profile of an object by means of causing a probe to follow a measurement surface of the object, wherein the probe including a stylus having a curvature radius of 1 mm or less provided at the extremity of the probe, the method comprising the steps of:
computing stylus profile error by determining a profile error caused by the curvature radius of the stylus by using measurement data of a reference ball to be used as a reference for calibration; and
correcting stylus profile by correcting measurement data of the object by using the stylus profile error.

7. The method according to claim 6,
wherein the step of correcting stylus profile includes the steps of:
correcting curvature by determining a contact position between the object and the stylus corresponding to the measurement data of the object and correcting a positional error caused by the curvature radius of the stylus by using an angle of inclination of the measurement surface of the object in the contact position; and
correcting profile error by extracting an amount of profile error in the contact position from the stylus profile error data and correcting the profile error caused by the curvature radius of the stylus by adding or subtracting the amount of the profile error.

8. A method for measuring the surface profile of an object by means of causing a probe to follow a measurement surface of the object, wherein the probe including a stylus having a curvature radius of 1 mm or less provided at the extremity of the probe, the method comprising the steps of:
computing stylus profile error by determining a profile error caused by the curvature radius of the stylus by using measurement data of a reference ball to be used as a reference for calibration; and
correcting stylus profile by correcting measurement data of the object by using the stylus profile error;
wherein the step of correcting stylus profile includes the steps of:
correcting curvature by determining a contact position between the object and the stylus corresponding to the measurement data of the object and correcting a positional error caused by the curvature radius of the stylus by using an angle of inclination of the measurement surface of the object in the contact position: and
correcting profile error by extracting an amount of profile error in the contact position from the stylus profile error data and correcting the profile error caused by the curvature radius of the stylus by adding or subtracting the amount of the profile error;
wherein the step of correcting profile error includes the steps of:
specifying a position on the reference ball at the time of measurement of the reference ball by using the angle of inclination of the measurement surface in the contact position between the stylus and the object, wherein the determined position is corresponding to the contact position of the stylus;
extracting a profile error in the specified position on the reference ball at the time of measurement of the reference ball as the amount of the profile error in the contact position of the stylus; and
correcting a profile error caused by the curvature radius of the stylus by using the extracted profile error.

9. The method according to claim 8,
wherein the amount of profile error in the contact position of the stylus is determined by interpolation based on deviation data, and
wherein the deviation data have been discretely acquired as the stylus profile error data at the time of measurement of the reference ball and pertain to a design equation.

10. The method according to claim 9,
wherein the amount of profile error in the contact position of the stylus is determined by interpolation from the discrete deviation data by using a spline curve.

11. The profilometer according to claim 10,
wherein the tip end of the stylus is made of diamond.

12. A method for measuring the surface profile of an object by means of causing a probe to follow a measurement surface of the object, wherein the probe including a stylus having a curvature radius of 1 mm or less provided at the extremity of the probe, the method comprising the steps of:
computing stylus profile error by determining a profile error caused by the curvature radius of the stylus by using measurement data of a reference ball to be used as a reference for calibration; and
correcting stylus profile by correcting measurement data of the object by using the stylus profile error;
wherein the step of correcting stylus profile includes the steps of:
correcting curvature by determining a contact position between the object and the stylus corresponding to the measurement data of the object and correcting a positional error caused by the curvature radius of the stylus by using an angle of inclination of the measurement surface of the object in the contact position: and
correcting profile error by extracting an amount of profile error in the contact position from the stylus profile error data and correcting the profile error caused by the curvature radius of the stylus by adding or subtracting the amount of the profile error;
wherein the amount of profile error in the contact position of the stylus is determined by interpolation based on deviation data, and
wherein the deviation data have been discretely acquired as the stylus profile error data at the time of measurement of the reference ball and pertain to the design equation.

13. The method according to claim 12,
wherein the amount of profile error in the contact position of the stylus is determined by interpolation from the discrete deviation data by using a spline curve.

14. A method of manufacturing an object of measurement comprising the steps of:
detecting deviation by producing deviation data by using a design equation of the object and a profile data of the object measured by using the method as defined in any one of claims 8 through 10; and machining for machining the profile of the object by feeding back the deviation data.

15. A method of manufacturing an object of measurement comprising the steps of:

detecting deviation for producing deviation data by using a design equation of the object and a profile data of the object measured by using a method for measuring the surface profile of an object by means of causing a probe to follow a measurement surface of the object, wherein the probe including a stylus having a curvature radius of 1 mm or less provided at the extremity of the probe, the method comprising the steps of: computing stylus profile error by determining a profile error caused by the curvature radius of the stylus by using measurement data of a reference ball to be used as a reference for calibration; and correcting stylus profile by correcting measurement data of the object by using the stylus profile error; and machining for machining the profile of the object by feeding back the deviation data.

16. A method of manufacturing an object of measurement comprising the steps of:

detecting deviation for producing deviation data by using a design equation of the object and a profile data of the object measured by using a method for measuring the surface profile of an object by means of causing a probe to follow a measurement surface of the object, wherein the probe including a stylus having a curvature radius of 1 mm or less provided at the extremity of the probe, the method comprising the steps of: computing stylus profile error by determining a profile error caused by the curvature radius of the stylus by using measurement data of a reference ball to be used as a reference for calibration; and correcting stylus profile by correcting measurement data of the object by using the stylus profile error; wherein the step of correcting stylus profile includes the steps of: correcting curvature by determining a contact position between the object and the stylus corresponding to the measurement data of the object and correcting a positional error caused by the curvature radius of the stylus by using an angle of inclination of the measurement surface of the object in the contact position; and correcting profile error by extracting an amount of profile error in the contact position from the stylus profile error data and correcting the profile error caused by the curvature radius of the stylus by adding or subtracting the amount of the profile error; and machining for machining the profile of the object by feeding back the deviation data.

\* \* \* \* \*

UNITED STATES PATENT AND TRADEMARK OFFICE
CERTIFICATE OF CORRECTION

| | |
|---|---|
| PATENT NO. | : 6,763,319 B2 |
| DATED | : July 13, 2004 |
| INVENTOR(S) | : Koji Handa et al. |

It is certified that error appears in the above-identified patent and that said Letters Patent is hereby corrected as shown below:

Column 8,
Line 2, please delete "(step S1)" and insert therefor -- (step S11) --.

Signed and Sealed this

Twenty-third Day of November, 2004

JON W. DUDAS
*Director of the United States Patent and Trademark Office*